United States Patent [19]

Gendreau et al.

[11] Patent Number: 4,955,613
[45] Date of Patent: Sep. 11, 1990

[54] POLYBUTADIENE GOLF BALL PRODUCT

[75] Inventors: Paul M. Gendreau, Swansea; Lauro C. Cadorniga, S. Dartmouth, both of Mass.

[73] Assignee: Acushnet Company, New Bedford, Mass.

[21] Appl. No.: 319,640

[22] Filed: Mar. 6, 1989

[51] Int. Cl.$^5$ .................. A63B 37/00; A63B 37/06; A63B 37/12
[52] U.S. Cl. .................. 273/218; 273/230; 273/235 R; 273/222; 260/998.14; 524/908; 525/193; 525/236
[58] Field of Search ............... 525/193, 236; 524/908; 273/218, 220, 230, 222, 228, 227, 255 R; 260/998.14

[56] References Cited

U.S. PATENT DOCUMENTS

| | | | |
|---|---|---|---|
| 4,076,255 | 2/1978 | Moore et al. | 524/523 |
| 4,683,257 | 7/1987 | Kakiuchi et al. | 525/193 |
| 4,715,607 | 12/1987 | Llort et al. | 524/908 |
| 4,770,422 | 9/1988 | Isaac | 524/908 |

*Primary Examiner*—Allan M. Lieberman
*Attorney, Agent, or Firm*—Lucas & Just

[57] ABSTRACT

The golf ball product is made from two polybutadienes, each having a Mooney viscosity of below about 50 and a cis-1,4 content of greater than about 40%. One polybutadiene is nickel- or cobalt-catalyzed, while the other is lanthanide-catalyzed. The golf ball product includes a mix of the two polybutadienes, a metal salt of an unsaturated carboxylic acid and a free radical initiator.

10 Claims, No Drawings

POLYBUTADIENE GOLF BALL PRODUCT

This invention relates to golf balls and, more particularly, to an improved golf ball product made from a mix of two polybutadienes, each having a Mooney viscosity of no greater than about 50 (50 ML1+4(100° C.)).

Golf balls are made in three configurations: one-piece, two-piece and wound. A one-piece golf ball is a solid, homogeneous mass of rubber-like material, while a two-piece golf ball has a solid rubber core around which a cover has been molded. Wound golf balls are made by winding elastic thread about a center to produce a wound core. A cover is then molded about the wound core. The center is either a solid rubber mass or a liquid-filled envelope.

The term "golf ball product" as used herein means a unitary, one-piece golf ball, the core or cover of a two-piece golf ball, or the solid center or cover of a wound golf ball.

The United States Golf Association (USGA) promulgates rules for the game of golf which include specifications for the golf ball itself. Compliance with USGA rules is not obligatory and, indeed, some companies actually allege that they sell "hot" balls that violate USGA rules. Any major manufacturer of golf balls could easily make a "hot" ball which violates the USGA rules; however, all respectable manufacturers adhere to the USGA rules religiously since violation of a rule can result in the ball being banned from all USGA play. There are three performance tests for golf balls imposed by the USGA, one relating to velocity, another relating to golf ball symmetry, and the third relating to overall distance.

The velocity requirement, commonly referred to as the maximum initial velocity, specifies that the golf ball may not exceed a velocity of 250 feet (76.2 m) per second when measured on apparatus approved by the USGA. There is a 2% tolerance on the velocity, i.e. the highest permissible velocity is 255 feet (77.72 m) per second. Most manufacturers include a safety factor and make their average maximum velocities at some lesser value, such as in the 250–253 ft. (76.2–77.11 m) per second range, to minimize the risk of being declared "illegal."

U.S. Pat. No. 4,683,257, issued July 28, 1987, teaches a blend of two polybutadienes for use in a core of a two-piece golf ball where one of the polybutadienes has a Mooney viscosity of 70 to 100 (ML 1+4(100° C.)).

Applicants have now discovered a golf ball product made from a mix of two polybudatienes, each having a Mooney viscosity of no greater than about 50 (50 ML 1+4(100° C.)). A golf ball made in accordance with the present invention has been shown to have an improvement in initial velocity of about 1 foot (0.32 m) per second over a golf ball made with either one of the polybutadienes alone or with one of the polybutadienes and natural I5 rubber.

The golf ball product of the present invention has been found to be especially useful as a core of a two-piece golf ball.

The Mooney viscosity values used in the specification and claims were made in accordance with ASTM D1646-74 wherein the test parameters were L 1+4(100° C.). "L" indicates the use of the large rotor ("S" would indicate the small rotor), "1" is the time in minutes that the specimen was permitted to warm in the machine before starting the motor, "4" is the time in minutes after starting the motor at which the reading is taken, and "100° C." is the temperature of the test.

A golf ball product made in accordance with the present invention comprises a mix of two polybutadienes, each said polybutadiene having a Mooney viscosity of below about 50; a metal salt of an unsaturated carboxylic acid; and a free radical initiator. Inorganic fillers may be added to adjust the weight or color of the golf ball product.

Each of the two polybutadienes has a cis-1,4 content greater than about 40% and, more preferably, greater than or equal to about 90%. Preferably, each of the two polybutadienes has a Mooney viscosity between about 35 to 50 and, more preferably, between about 40 to 45. Preferably, one of the polybutadienes has been prepared by polymerizing butadiene monomers with a nickel- or cobalt-containing catalyst while the other polybutadiene has been polymerized from butadiene monomers in the presence of a lanthanide-containing catalyst.

Nickel-containing catalysts used to prepare polybutadiene from butadiene monomers are, for example, one-component catalysts such as nickel on diatomaceous earth, two-component catalysts such as Raney nickel/titanium tetrachloride, and three-component catalysts such as nickel compound/organometal/trifluoroborate etherate. Examples of the nickel compounds include reduced nickel on carrier, Raney nickel, nickel oxides, nickel carboxylate, and organic nickel complex salts. Examples of the organometals include trialkyl aluminums such as triethyl aluminum, tri-n-propyl aluminum, triisobutyl aluminum, and tri-n-hexyl aluminum; alkyl lithiums such as n-butyl lithium, sec-butyl lithium, tert-butyl lithium, and 1,4-butane dilithium; dialkyl zincs such as diethyl zinc and dibutyl zinc; and the like. Polymerization of butadiene in the presence of these catalysts is generally carried out by continuously charging a reactor with butadiene monomer along with a solvent such as aliphatic, aromatic and cycloaliphatic hydrocarbon solvents, and a catalyst such as nickel octanoate and triethyl aluminum and controlling the reaction temperature in the range of 5° to 60° C. and the reaction pressure in the range from one to several atmospheres, namely from atmospheric pressure to about 70 atmospheres, such that a product having a predetermined Mooney viscosity may be obtained.

Examples of the cobalt-containing catalysts include elemental cobalt and cobalt compounds such as Raney cobalt, cobalt chloride, cobalt bromide, cobalt iodide, cobalt oxide, cobalt sulfate, cobalt carbonate, cobalt phosphate, cobalt phthalate, cobalt carbonyl, cobalt acetylacetonate, cobalt diethyldithiocarbamate, cobalt anilinium nitrite, cobalt dinitrosyl chloride, etc. In particular, combinations of these cobalt compounds with a dialkyl aluminum monochloride (e.g. diethyl aluminum monochloride and diisobutyl aluminum monochloride), a trialkyl aluminum (e.g. triethyl aluminum, tri-n-propyl aluminum, triisobutyl aluminum, and tri-n-hexyl aluminum), and aluminum chloride or with an alkyl aluminum sesquichloride (e.g. ethyl aluminum sesquichloride) and aluminum chloride are preferred catalysts for use in the preparation of polymers of cis-1,4 bond type. The process of preparing polybutadienes using the cobalt-containing catalysts is similar to that used with the nickel-containing catalysts.

A lanthanide-containing catalyst comprises a lanthanide rare earth element compound (hereinafter simply referred to as a lanthanide compound), an organoaluminum compound, a Lewis base and, optionally, a Lewis acid. The lanthanide compounds include halides, carboxylates, alcoholates, thioalcoholates, and amides of metals having atomic numbers of 57 to 71, with neodymium being the preferred lanthanide compound. The organoaluminum compounds used herein may be those having the general formula $AlR^1R^2R^3$ wherein $R^1$, $R^2$ and $R^3$ are independently selected from hydrogen and hydrocarbon residues having 1 to 8 carbon atoms, and $R^1$, $R^2$ and $R^3$ may be the same or different.

The Lewis bases serve to convert the lanthanide compounds into complexes. Acetylacetone, ketone alcohols and the like may be used for this purpose.

The Lewis acids used include aluminum halides of the general formula: $AlX_nR_{(3-n)}$ wherein X is a halogen, R is a hydrocarbon residue (for example, hydrocarbon residues having 1 to about 20 carbon atoms such as alkyl, aryl, and aralkyl radicals), and n is equal to 1, 1.5, 2 or 3, and other metal halides such as silicon tetrachloride, tin tetrachloride, and titanium tetrachloride.

When butadiene is polymerized in the presence of the lanthanide-containing catalyst, the molar ratio of butadiene to lanthanide compound preferably ranges from $5 \times 10^2$ to $5 \times 10^6$, especially from $10^3$ to $10^5$, and the molar ratio of $AlR^1R^2R^3$ to lanthanide compound preferably ranges from 5 to 500, especially from 10 to 300. The preferred proportion of Lewis base to lanthanide compound is at least 0.5, and especially ranges from 1 to 20 in molar ratio. When a Lewis acid is used, the preferred proportion of halide in the Lewis acid to lanthanide compound ranges from 1 to 10, especially from 1.5 to 5 in molar ratio.

In the polymerization of butadiene, the lanthanide-containing catalysts may be used as solution in a suitable solvent such as n-hexane, cyclohexane, n-heptane, toluene, xylene, benzene, etc., or carried on suitable carriers such as silica, magnesia and magnesium chloride.

Polymerization of butadiene may be carried out in a solvent such as n-hexane, cyclohexane, n-heptane, toluene, xylene, benzene, etc., or bulk polymerization without a solvent may also be employed. The polymerization temperature typically ranges from $-30°$ C. to $150°$ C. and, preferably, from $10°$ C. to $80°$ C. The polymerization pressure may vary depending on other conditions.

The term "lanthanide-catalyzed polybutadiene" as used in the specification and claims means a polybutadiene made rom butadiene monomers polymerized with a lanthanide-containing catalyst. The term "group VIII-catalyzed polybutadiene" means a polybutadiene made from butadiene monomers polymerized with a nickel- or cobalt-containing catalyst. The term "nickel-catalyzed polybutadiene" means a polybutadiene made from butadiene monomers polymerized with a nickel-containing catalyst. The term "cobalt-catalyzed polybutadiene" means a polybutadiene made from butadiene monomers polymerized with a cobalt-containing catalyst.

A golf ball product made in accordance with the present invention comprises about 15 to about 85 parts by weight per 100 parts of rubber (phr) of a group VIII-catalyzed polybutadiene having a Mooney viscosity of no greater than about 50 and about 85 to about 15 phr of a lanthanide-catalyzed polybutadiene having a Mooney viscosity of no greater than about 50. More preferred is to employ about 75 to about 25 phr of a group VIII-catalyzed polybutadiene having a Mooney viscosity of no greater than about 50 and about 25 to about 75 phr of a lanthanide-catalyzed polybutadiene having a Mooney viscosity of no greater than about 50. Good results have been obtained with about 50 phr of a group VIII-catalyzed polybutadiene having a Mooney viscosity of no greater than about 50 and about 50 phr of a lanthanide-catalyzed polybutadiene having a Mooney viscosity of no greater than about 50.

The unsaturated carboxylic acid is an alpha, beta ethylenically unsaturated carboxylic acid having 3 to 8 carbon atoms such as methacrylic, acrylic, cinnamic and crotonic acid, of which acrylic and methacrylic are preferred. Suitable metal ions are sodium, potassium, magnesium, calcium, zinc, barium, aluminum, tin, zirconium, lithium and cadmium, of which sodium, zinc and magnesium are preferred. The metal ion is preferably introduced in the form of the salt of the carboxylic acid. The most preferred salts are zinc diacrylate and zinc dimethacrylate.

In the golf ball product made in accordance with the present invention about 25 to about 45 phr of a metal salt of an unsaturated carboxylic acid is used. More preferably, about 27 to about 35 phr of a metal salt of an unsaturated carboxylic acid is used. Good results have been obtained by using about 29 to about 33 phr of a metal salt of an unsaturated carboxylic acid.

The free radical initiator or catalyst is a peroxide. Suitable peroxides include 1,1-di(t-butylperoxy)-3,3,5-trimethyl cyclohexane; t-butylperbenzoate; and a-a bis(t-butylperoxy) diisopropylenebenzene. Preferably, a combination of a-a bis(t-butylperoxy) diisopropylenebenzene and 1,1-di(t-butylperoxy)-3,3,5-trimethyl cyclohexane is used. Use of a dual initiator system is taught in U.S. Pat. No. 4,692,497 issued Sept. 8, 1987. The teachings of the '497 patent are incorporated herein by reference.

The total amount of free radical initiator used is between about 0.2 to about 2.0 phr and, more preferably, about 0.5 to about 1.0 phr. Good results have been obtained with about 0.5 to about 0.75 phr of free radical initiator.

Typical inorganic fillers include zinc oxide, titanium oxide and barium sulfate and are used in an amount of about 5 to about 25 phr.

A golf ball product made in accordance with the present invention comprises about 15 to about 85 phr of a group VIII-catalyzed polybutadiene having a cis-1,4 content above about 40% and a Mooney viscosity of no greater than about 50; about 15 to about 85 phr of a lanthanide-catalyzed polybutadiene having a cis-1,4 content above about 40% and a Mooney viscosity of no greater than about 50; about 25 to about 45 phr of a metal salt of an unsaturated carboxylic acid; about 0.2 to about 2.0 phr of a peroxide catalyst; and about 5 to about 25 phr of an inorganic filler.

Preferably, the golf ball product made in accordance with the present invention comprises about 25 to about 75 phr of a group VIII-catalyzed polybutadiene having a cis-1,4 content above about 40% and a Mooney viscosity of no greater than about 50; about 25 to about 75 phr of a lanthanide-catalyzed polybutadiene having a cis-1,4 content above about 40% and a Mooney viscosity of no greater than about 50; about 27 to 35 phr of a metal salt of an alpha, beta ethylenically unsaturated carboxylic acid having 3 to 8 carbon atoms; a peroxide catalyst; about 0.5 to about 1.0 phr by weight of a peroxide catalyst; and about 5 to about 25 phr of an organic filler.

Most preferred is a golf ball product comprising about 50 phr of a group VIII-catalyzed polybutadiene having a cis-1,4 content of 90% or above and a Mooney viscosity of no greater than about 50; about 50 phr of a lanthanide-catalyzed polybutadiene having a cis-1,4 content of 90% or above and a Mooney viscosity of no greater than about 50; about 29 to about 33 phr of a metal salt of an unsaturated carboxylic acid; about 0.5 to about 0.75 phr of a peroxide catalyst; and about 5 to about 25 phr of an inorganic filler.

In order to form a golf ball product in accordance with the present invention, the two polybutadienes, the metal salt of a carboxylic acid and the inorganic filler are mixed together. When these components are initially mixed together, the temperature of the mixture rises to a temperature at which the polybutadienes and the metal carboxylate are readily admixed, suitably about 200° F. to 350° F. (93.3° C. to 176.7° C.). The mixing is continued at this elevated temperature until a good dispersion is achieved, which is generally about 3 to 30 minutes. The temperature of the mixture is then reduced to below the lower of the maximum stable temperatures of the free radical initiators to be used. The initiators are then added to the mixture, and the mixture is mixed while being held below the maximum stable temperature of the lower stable temperature of the free radical initiator for about 3 to 15 minutes. The mass is then suitably milled into slabs or extruded into rods from which pieces are cut slightly larger and heavier than the desired golf ball product to be formed. These pieces are placed in a golf ball product mold, such as a ball cup mold or a ball core mold, and cured at elevated temperature under pressure. A temperature of about 280° F. to 340° F. (137.8° C. to 171.1° C.) for a period of about 12 to 30 minutes has been found to be suitable. The pressure is not critical as long as it is sufficient to prevent the mold from opening during heating and curing.

These and other aspects of the present invention may be more fully understood with reference to the following examples.

EXAMPLE 1

This example illustrates making a golf ball product in accordance with the present invention. A total of five golf ball cores were made, two controls and three in accordance with the present invention. The compositions as well as the properties of the cores are illustrated in Table I below:

TABLE I

| Component | Control (phr) 1 | Control (phr) 2 | Present Invention (phr) 1 | Present Invention (phr) 2 | Present Invention (phr) 3 |
|---|---|---|---|---|---|
| Group VIII-catalyzed polybutadiene | 0 | 96 | 15 | 85 | 25 |
| Lanthanide-catalyzed polybutadiene | 100 | 0 | 85 | 15 | 75 |
| Rubber | 0 | 4 | 0 | 0 | 0 |
| Metal salt of unsaturated carbox. acid | 28 | 28 | 28 | 28 | 28 |
| Processing aid | 1.5 | 1.5 | 1.5 | 1.5 | 1.5 |
| Inorganic fillers | 28 | 28 | 28 | 28 | 28 |
| Peroxide | 0.53 | 0.53 | 0.53 | 0.53 | 0.53 |
| Physical Properties | | | | | |
| PGA Compression | 80 | 75 | 87 | 82 | 80 |

TABLE I-continued

| Component | Control (phr) 1 | Control (phr) 2 | Present Invention (phr) 1 | Present Invention (phr) 2 | Present Invention (phr) 3 |
|---|---|---|---|---|---|
| Core weight (grams) | 35.2 | 34.9 | 35.4 | 35.4 | 35.2 |
| Initial velocity (ft./sec.) | 251.1 | 250.7 | 252.1 | 251.9 | 251.2 |

The group VIII-catalyzed polybutadiene was Enichem 42 obtained from Enichem Co. Enichem 42 is a nickel-catalyzed polybutadiene having a Mooney viscosity of about 42.

The lanthanide-catalyzed polybutadiene was Shell 1220 obtained from Shell Co. and had a Mooney viscosity of about 45.

The rubber was conventional Standard Malaysia Rubber, natural rubber, a polymer of isoprene.

The metal salt of an unsaturated carboxylic acid was zinc diacrylate which is readily obtainable on the open market.

The processing aid was SR-350 obtained from Elastochem. SR-350 is trimethylol propane trimethacrylate.

The inorganic fillers were limestone, zinc oxide and barium sulfate. With respect to the amount of each component used, 5 phr of limestone, 14 phr of zinc oxide and 5 phr of barium sulfate were employed in each formulation.

The peroxide catalyst was a combination of 0.1 phr of Vulcup R and 0.43 phr of Varox 231XL. Vulcup R is a-a bis(t-butylperoxy) diisopropylenebenzene and Varox 231XL is 1,1-di(t-butylperoxy)-3,3,5-trimethyl cyclohexane.

These cores were made by mixing all components except the peroxide catalysts together for about 7 minutes in a Banbury mixer until good dispersion between the rubber components was achieved. The temperature during mixing rose to about 250° F. (122° C.). The temperature of the mix was then reduced to below the maximum stable temperature of both peroxide catalysts and then the catalysts were mixed in while the temperature of the mix was held below the maximum stabilization temperature of the catalysts. This mix was then made into pieces slightly larger than cores and the pieces were placed in conventional golf ball core molds for about 15 minutes at 325° F. (163° C.). The cores were then demolded and allowed to incubate at 72–75° F. (22–24° C.) for 24 hours. The core mold had an internal diameter of about 1.5 inches. The cores were then tested for physical properties after the incubation period.

The velocities obtained were comparable to those obtained in the standard USGA test. The PGA compression rating was obtained using a commercial PGA Compression Tester. Both of these measurement techniques are standard throughout the golf ball industry and are well-known to those of skill in the art of golf ball manufacturing.

EXAMPLE 2

Cores from Example 1, namely Present Invention 2 and Present Invention 3, had conventional Surlyn covers molded therearound and were tested for initial velocity along with a conventional golf ball, a Pinnacle manufactured by Acushnet Company. The Pinnacle is a two-piece golf ball having a solid core with a Surlyn cover. The results of these tests are illustrated in Table II below:

TABLE II

| Golf Ball | Initial Velocity |
| --- | --- |
| Pinnacle | 251.7 |
| Present Invention 2 | 252.57 |
| Present Invention 3 | 252.59 |

It will be understood that each and every numerical value which appears in the claims herein is modified by the term "about" if the modifying term "about" does not appear in front of such numerical value.

It will be understood that the claims are intended to cover all changes and modifications of the preferred embodiments of the invention herein chosen for the purpose of illustration which do not constitute a departure from the spirit and scope of the invention.

What is claimed is:

1. A golf ball product comprising a mix of two polybutadienes, said mix comprising about 85 to about 15 phr of a nickel- or cobalt-catalyzed polybutadiene having a cis-1,4 content above about 40% and a Mooney viscosity of no greater than about 50 and about 15 to about 85 phr of a lanthanide-catalyzed polybutadiene having a cis-1,4 content above about 40% and a Mooney viscosity of no greater than about 50; a metal salt of an unsaturated carboxylic acid; and a free radical initiator.

2. A golf ball product comprising about 15 to about 85 phr of a nickel- or cobalt-catalyzed polybutadiene having a cis-1,4 content above about 40% and a Mooney viscosity of no greater than about 50; about 15 to about 85 phr of a lanthanide-catalyzed polybutadiene having a cis-1,4 content above about 40% and a Mooney viscosity of no greater than about 50; about 25 to about 45 phr of a metal salt of an unsaturated carboxylic acid; about 0.2 to about 2.0 phr of a peroxide catalyst; and about 5 to about 25 phr of an inorganic filler.

3. The golf ball product of claim 2 wherein said metal salt of an unsaturated carboxylic acid is selected from the group consisting of zinc diacrylate and zinc dimethacrylate.

4. The golf ball product of claim 2 wherein said peroxide catalyst is selected from the group consisting of 1,1-di(t-butylperoxy-3,3,5-trimethyl cyclohexane; t-butylperbenzoate; and a-a bis (t-butylperoxy) diisopropylenebenzene.

5. The golf ball product of claim 2 wherein said peroxide catalyst is a combination of a-a bis(t-butylperoxy) diisopropylenebenzene and 1,1-di(t-butylperoxy)-3,3,5-trimethyl cyclohexane.

6. The golf ball product of claim 2 wherein said inorganic filler is selected from the group consisting of zinc oxide, titanium oxide and barium sulfate.

7. A golf ball core comprising:
   (a) about 15 to about 85 phr of a nickel- or cobalt-catalyzed polybutadiene having a cis-1,4 content above about 40% and a Mooney viscosity of no greater than about 50;
   (b) about 85 to about 15 phr of a lanthanide-catalyzed polybutadiene having a cis-1,4 content above about 40% and a Mooney viscosity of no greater than about 50;
   (c) about 25 to about 45 phr of a metal salt of an unsaturated carboxylic acid; and
   (d) a peroxide catalyst.

8. A golf ball core comprising:
   (a) a mix of two polybutadienes, said mix consisting of about 85 to about 15 phr of a nickel- or cobalt-catalyzed polybutadiene having a cis-1,4 content above about 40% and a Mooney viscosity of no greater than about 50; and about 15 to about 85 phr of a lanthanide-catalyzed polybutadiene having a cis-1,4 content above about 40% and a Mooney viscosity of no greater than about 50;
   (b) a metal salt of an alpha, beta ethylenically unsaturated carboxylic acid having 3 to 8 carbon atoms; and
   (c) a peroxide catalyst.

9. The golf ball core of claim 7 wherein said metal salt is present in an amount of between about 25 to about 45 phr and said peroxide catalyst is present in an amount of between about 0.2 to about 2.0 phr.

10. The golf ball core of claim 9 further comprising about 5 to about 25 phr of an inorganic filler.

* * * * *